(12) United States Patent
Sturt et al.

(10) Patent No.: US 7,641,252 B2
(45) Date of Patent: Jan. 5, 2010

(54) CONSOLE ASSEMBLY FOR A VEHICLE

(75) Inventors: Alan Sturt, West Bloomfield, MI (US); Christopher Jones, Southfield, MI (US)

(73) Assignee: International Automotive Components Group, North America Inc., Dearborn, MI (US)

( * ) Notice: Subject to any disclaimer, the term of this patent is extended or adjusted under 35 U.S.C. 154(b) by 0 days.

(21) Appl. No.: 11/767,780

(22) Filed: Jun. 25, 2007

(65) Prior Publication Data

US 2008/0315606 A1    Dec. 25, 2008

(51) Int. Cl.
     *B60R 7/04*      (2006.01)
(52) U.S. Cl. .................................. 296/24.34; 296/37.8
(58) Field of Classification Search ............. 296/24.34, 296/37.8
See application file for complete search history.

(56) References Cited

U.S. PATENT DOCUMENTS

| | | | | |
|---|---|---|---|---|
| 3,356,409 A | * | 12/1967 | Belsky et al. ............ | 296/24.34 |
| 4,809,897 A | * | 3/1989 | Wright, Jr. ................. | 224/282 |
| 5,562,331 A | * | 10/1996 | Spykerman et al. .... | 297/188.16 |
| 6,616,205 B2 | * | 9/2003 | Bruhnke et al. ............ | 296/37.8 |
| 6,726,267 B2 | * | 4/2004 | Kim et al. ................. | 296/24.34 |
| 6,746,067 B2 | * | 6/2004 | Schmidt et al. .......... | 296/37.13 |
| 6,866,319 B2 | * | 3/2005 | Hupfer ....................... | 296/37.8 |
| 6,929,304 B1 | * | 8/2005 | Dry et al. .................... | 296/37.8 |
| 7,114,755 B1 | * | 10/2006 | Sturt et al. ................ | 296/24.34 |
| 2002/0163215 A1 | * | 11/2002 | Emerling et al. ........... | 296/24.1 |
| 2006/0071497 A1 | * | 4/2006 | Radu et al. ................ | 296/24.34 |
| 2006/0113811 A1 | * | 6/2006 | Tanaka et al. ............ | 296/24.34 |
| 2007/0152461 A1 | * | 7/2007 | Joler et al. ................ | 296/24.34 |
| 2008/0100103 A1 | * | 5/2008 | Kim ....................... | 297/188.19 |

\* cited by examiner

*Primary Examiner*—Dennis H Pedder
(74) *Attorney, Agent, or Firm*—Brooks Kushman P.C.

(57) ABSTRACT

A console assembly configured for use in a passenger seating area of a vehicle. The console assembly includes a lower console module having a housing extending generally horizontally adjacent a floor of the passenger seating area and an upper console module having a housing disposed adjacent and operatively connected to the lower console module. One or more panels are pivotally connected to the upper console module adjustable between at least a stored position disposed adjacent the upper console module housing and a deployed position wherein the one or more panels form a presentation surface for use in the passenger seating area of the vehicle.

18 Claims, 4 Drawing Sheets

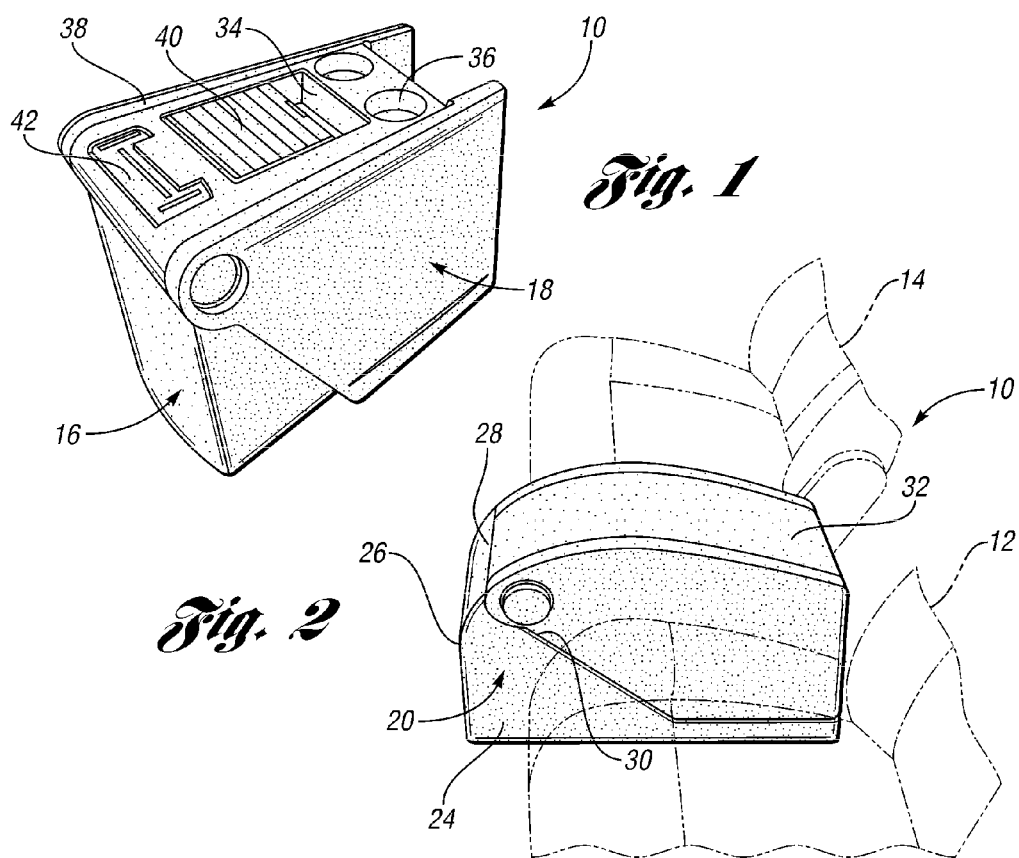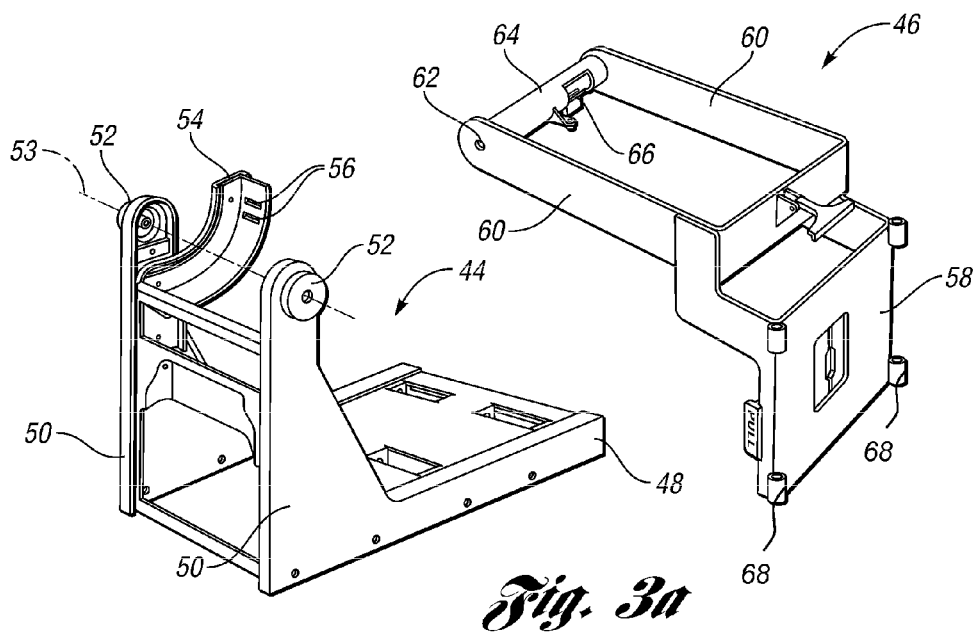

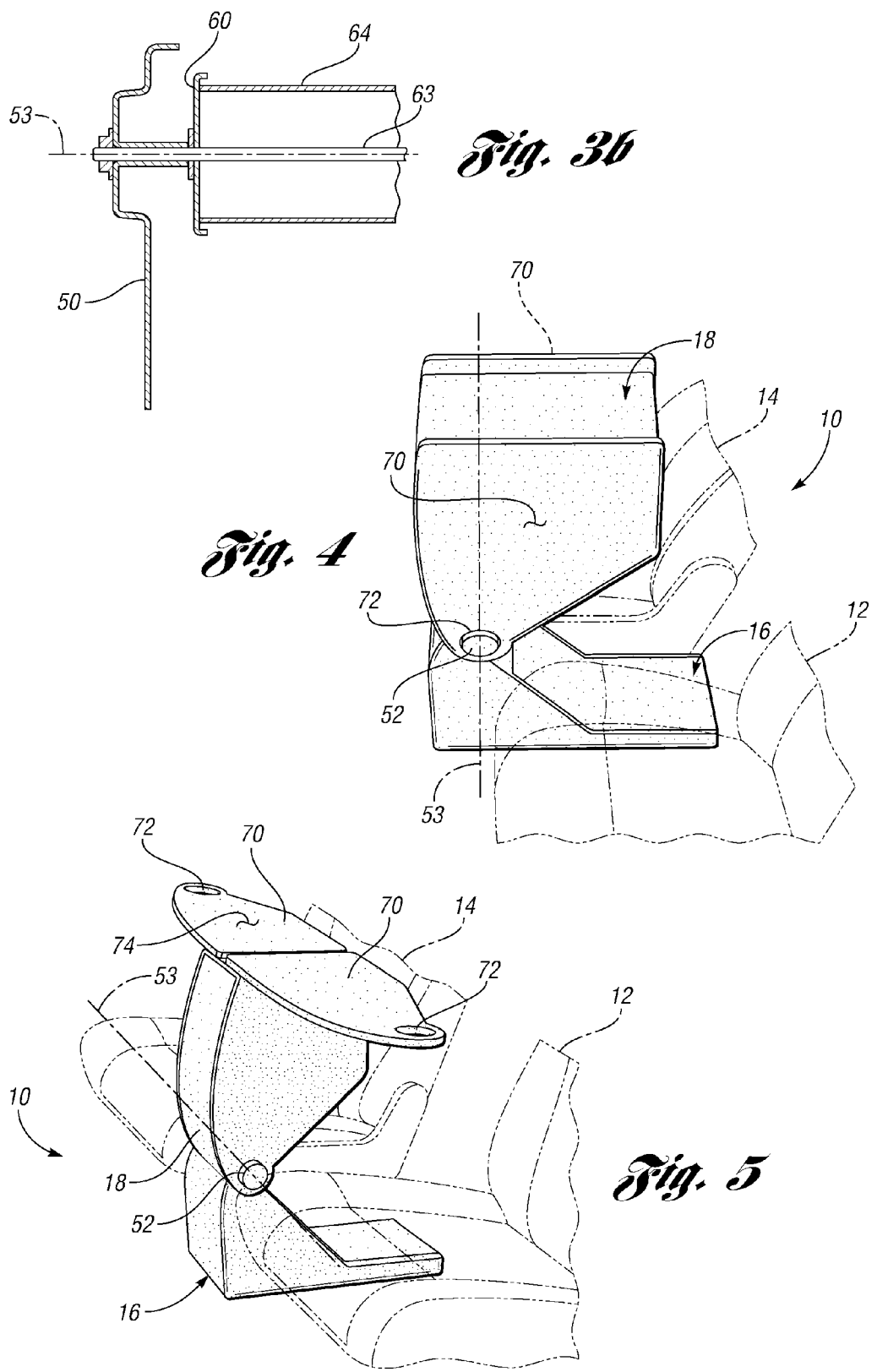

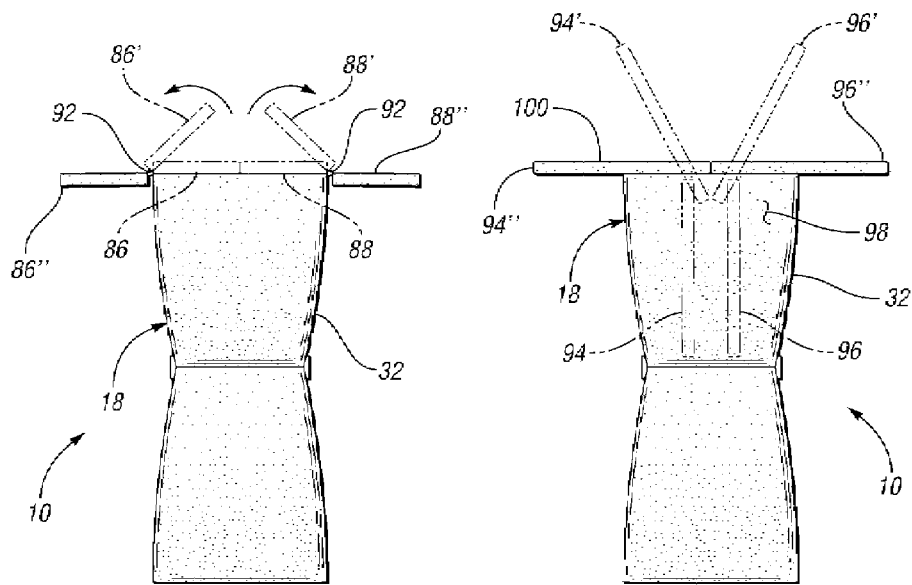
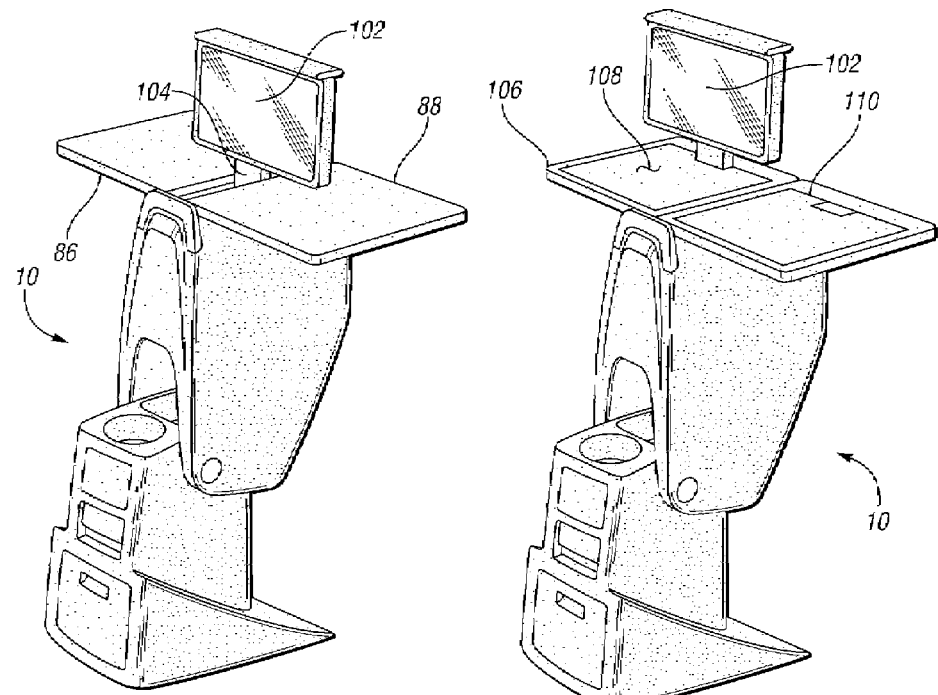

US 7,641,252 B2

CONSOLE ASSEMBLY FOR A VEHICLE

BACKGROUND OF THE INVENTION

1. Field of the Invention

The present invention relates generally to a console assembly for a passenger seating area of a vehicle.

2. Background Art

Vehicle manufacturers continue to develop storage containers and devices for the passenger compartments of vehicles to accommodate occupant's personal items and automotive components. Several current storage containers are designed to fit within specified areas of the passenger compartment and allow limited access to items stored therein. Vehicles typically include any number of storage areas for storing items, such as but not limited to map pockets, seat pockets, overhead compartments, center consoles, etc.

Many automotive vehicles include a center console or other storage device disposed between passenger seats in the front passenger compartment of the vehicle. Typically, the center console is disposed between the driver and passenger seats in a forward seating area of the vehicle. However, it is common in larger vehicles, such as sport utility vehicles and vans, to provide center consoles between the second and/or third row passenger seating areas. Many of these consoles are affixed within the vehicle such that they are not easily moveable from one location to the next. Some vehicle layouts, such as but not limited to those associated with multiple rows of seating, may be suitable for use with moveable consoles.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 is a perspective view of a console assembly for a passenger seating area or compartment of a vehicle;

FIG. 2 is a perspective view of the console assembly disposed between a pair of passenger seats in the passenger compartment of the vehicle;

FIG. 3a is a perspective view of a base frame and rotating frame configured for use with the base frame for use with the console assembly;

FIG. 3b is a sectional view of the linkage of the rotating frame of the console assembly;

FIG. 4 is a perspective view of the console assembly in a raised position;

FIG. 5 is a perspective view of the console assembly in a deployed position;

FIG. 9a is a side plan view of the console assembly illustrating one deployment feature of the assembly;

FIG. 9b is a side plan view of the console assembly illustrating another deployment feature of the assembly;

FIG. 10a is a perspective view of a video display configured for use with the console assembly; and FIG. 10b is a perspective view of a video display configured for use in another position with the console assembly.

DETAILED DESCRIPTION OF THE PREFERRED EMBODIMENT(S)

Figure 6:
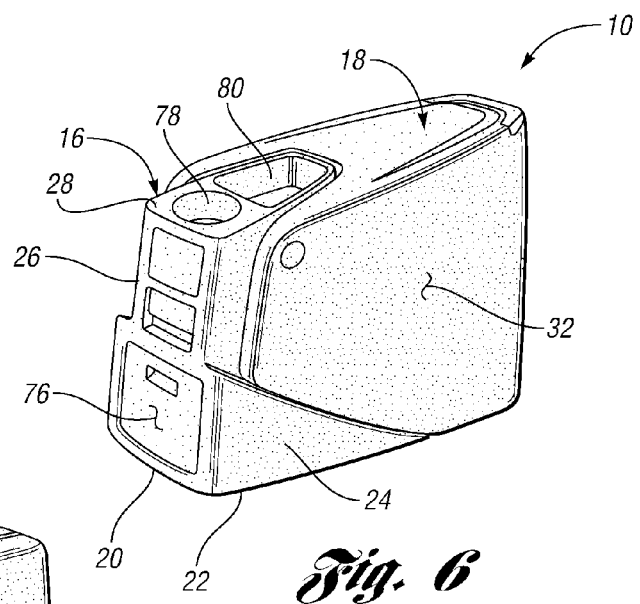
FIG. 6 is a perspective view of another configuration of the console assembly.

Referring now to the Figures, a console assembly for use in the passenger seating area of a motor vehicle in accordance with the present invention is disclosed. It is understood that the console assembly may be used in either the front or rear passenger seating areas. For purposes of this disclosure, the console assembly will be installed in a rear passenger seating area between a pair of front passenger seats.

In the following description, various operating parameters and components are described for a number of constructed embodiments. These specific parameters and components are included as examples and are not meant to be limiting. More specifically, directional language such as "left", "right", "above", "below", "upper", "lower" and words of similar import designate directions shown in the drawings. Such directional terminology is used for clarity and is not intended to strictly limit the orientation of any aspect of the invention to a particular plane or direction.

Referring now to Figures, a console assembly 10 is disposed between a pair of passenger seats 12, 14 in the passenger compartment of the vehicle 16. Passenger seats 12, 14 are shown to include bucket seats. The present invention fully contemplates its use in any number of vehicles, including but not limited to other automobiles, watercraft, or aircraft. Further, the present invention contemplates the use of any number and type of seats, including bench seats, and is not intended to be limited to the non-limiting aspect of the present invention shown in the Figures. It is understood that the console assembly may be used in either the front or rear passenger seating areas. For purposes of this disclosure, the console assembly will be installed in a rear passenger seating area between a pair of passenger seats.

As illustrated in FIGS. 1 and 2, console assembly 10 includes a first or lower console module 16 disposed adjacent the floor of the passenger compartment of the vehicle and a second or upper console module 18 disposed adjacent and movable relative to the lower console module 16. Lower console module 16 includes a housing 20 having a base or lower surface 22 securable to the floor of the passenger compartment of the vehicle, a pair of opposing side surfaces 24 extending upward from the base, a front surface 26 extending between the side surfaces 24 and a top surface 28 formed therein. A rear surface 30 of the lower console module 16 is generally shaped to cooperate with a corresponding portion of the housing 32 of upper console module 18.

The housing 32 of upper console module 18 may be configured to include a variety of storage compartments or areas, such as a storage bin 34 or beverage container or cup holders 36, formed on an external portion or top surface 38 of the console housing 32. The top surface 38 of the upper console module housing 32 may further be configured to act as an armrest for the occupant of the vehicle seats. A cover 40 may be disposed at least partially adjacent the storage area or bin 34 and be movable between a closed position and one or more open positions.

The storage bin 34 may be configured to receive and store a variety of personal items, including mobile telephones, sunglasses, purses, bags or the like. Storage bin 34 may include one or more power conduits for supplying electrical power to electronic components such as computers, video players, mobile phones and the like or other passenger convenience devices. Cover 40 may be configured to fully enclose storage bin 34 to secure items stored therein as the upper console module 18 is moved relative to the lower console module 16. Control elements 42 may also be incorporated into the top surface 38 of the upper console module 18 to allow occupants to adjust various settings of convenience features in the vehicles, such as lighting, climate control and the like.

Referring now to FIGS. 3a and 3b, cooperating brackets 44, 46 of console assembly are described in greater detail. First bracket 44 cooperates with the lower console module housing. It is understood that bracket 44 assembled into the lower console module housing or, alternatively, the surfaces of the lower console module housing may be formed about the first bracket 44. Bracket 44 includes a support frame 48 having a pair of projections 50 extending generally upward from the frame 48. A pivot 52 is formed on an outer surface of each of the projections. Pivots 52 are generally in axial alignment along pivot axis 53. A guide 54 extends from support frame 48 and includes one or more channels 56 configured to provide securement portions for cooperation with the second bracket 46.

Second bracket 46 cooperates with the upper console module housing. It is understood that bracket 46 assembled into the upper console module housing or, alternatively, the surfaces of the upper console module housing may be formed about the bracket 46. Bracket 46 includes a support frame 58 having a pair of arms 60 extending away from the frame 58. Arms 60 each include a hole 62 that may be configured for alignment with a corresponding hole on pivots 52 on the first mounting bracket 44. It is contemplated that first and second mounting brackets 44, 46 are connected by a link 64 including a pivot pin 63 or by pivot bolts. Link 64 extending between arms 60 may be a structural support for bracket 46. Pivot pin or pivot bolts may extend through or engage holes 62 in arms 60 of frame 58 to rotatably secure the first and upper console module housings thereby.

Link 64 may include a locking mechanism 66 formed thereon or mounted thereto. Latching mechanism 66 includes a locking member that may be configured to engage the one or more channels 56 on guide 54. As will be described in greater detail below, the releasable engagement of latching mechanism 66 to the one or more channels 56 allows the upper console module to be operatively connected and movably and securably positioned between a first position relative to the lower console module and at least one second position away from the lower console module. It is contemplated, as illustrated in FIG. 3a, that guide 54 may be arcuately shaped to aid in the rotatable adjustment of the upper console module relative to the lower console module. Further, as will be described later, second mounting bracket 46 may include one or more hinges 68 for pivotally connecting one or more panels to the upper console module housing.

Referring now to FIGS. 4 and 5, first and upper console modules 16, 18 of console assembly 10 are moved from a stored position illustrated in FIGS. 1 and 2 to a deployed position. FIG. 4 illustrates upper console module 18 operatively connected to the lower console module 16 in an upright position pivoted about the pivot axis 53 relative to the lower console module 16 between the passenger seats 12, 14. Referring back to FIGS. 3a and 3b, second bracket 46 rotates about link 64 on pivot axis 53 relative to first bracket 44. Once the second bracket 46 cooperating with the upper console module is placed in the upright position, locking mechanism 66 engages the one or more channels 56 on guide 54 of first bracket 54 to secure the upper console module in the upright position.

Referring now to FIG. 5, one or more panels 70 are pivotally connected to the upper console module 18. As illustrated in FIG. 3a, one or more hinges 68 pivotally connect the one or more panels 70 to the upper console module housing 18. As will be described in greater detail, other mounting and storing arrangements for the one or more panels are contemplated. Panels 70 may include one or more apertures 72. Apertures 72 may be sized to fit around pivot 52 on the lower console module 16 when the panels 70 are placed adjacent the upper console module 18. It is also contemplated that the apertures 72 may act as beverage holders when the panels are placed in a deployed position.

FIGS. 4 and 5 illustrate movement of the one or more panels 70 from a stored position to a deployed position. As described above, the one or more panels 70 are disposed generally adjacent the upper console module 18. Once the upper console module 18 is placed in an upright position relative to the lower console module as illustrated in FIG. 4, the one or more panels may be pivotally adjusted from the stored position generally planar to the sides of the upper console module 18 to a deployed position generally perpendicular to the sides of the upper console module 18.

As illustrated in FIG. 5, when two panels 70 are pivoted to the deployed position, the cooperating panels 70 may form a presentation surface 74 for use by occupants of the passenger compartment of the vehicle. Panels 70 may include a latching mechanism (not shown) for securing the panels 70 in a generally perpendicular deployed position relative to the upper console module. It is understood that a release mechanism is provided with the first and second brackets such that the upper console module may be returned to a stored position adjacent the lower console module.

Referring now to FIGS. 6-10, another configuration of the console assembly 10 is illustrated and described herein. Identical reference numbers are used to described common components of the console assembly illustrated in FIGS. 1-5. Console assembly 10 is disposed between a pair of passenger seats 12, 14 in the passenger compartment of the vehicle. Console assembly 10 includes a lower console module 16 disposed adjacent the floor of the passenger compartment of the vehicle and a upper console module 18 disposed adjacent and movable relative to the lower console module 16.

Lower console module 16 includes a housing 20 having a base or lower surface 22 securable to the floor of the passenger compartment of the vehicle, a pair of opposing side surfaces 24 extending upward from the base, a front surface 26 extending between the side surfaces 24 and a top surface 28 formed therein. A rear surface 30 of the lower console module 16 is generally shaped to cooperate with a corresponding portion of the housing 32 of upper console module 18.

The front surface 26 of the lower console module housing 20 may include one or more storage compartments 76 configured to receive and store a variety of personal items, including mobile telephones, sunglasses, purses, bags or the like. One or more beverage container or cup holders 78 or storage bins 80 may be formed in the top surface 28 of the lower console module housing 20 for access by occupants of the passenger compartment of the vehicle.

Figure 7:
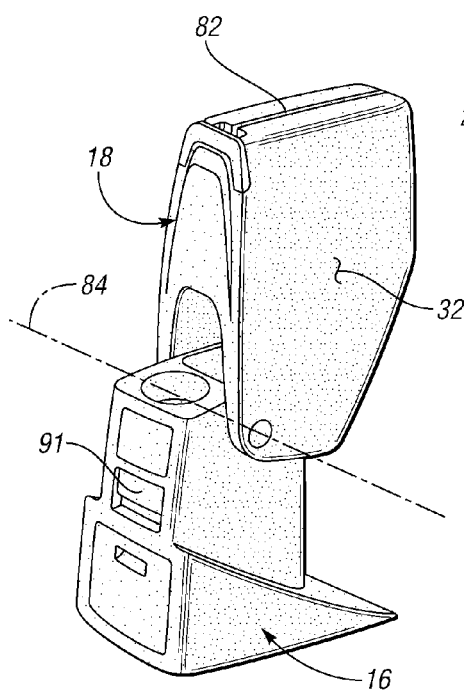
FIG. 7 is a perspective view of the console assembly in the raised position.

The top surface 38 of the upper console module housing 32 may be configured to act as an armrest for the occupant of the vehicle seats. As illustrated in FIG. 7, the rear surface 82 of the upper console module may be configured to receive and store one or more deployable panels 70 as will be described in greater detail. Control elements 42 may also be incorporated into the top surface 26 of the lower console module housing 32 and/or the top surface 38 of the upper console module housing 32 to allow occupants to adjust various settings of convenience features in the vehicles, such as lighting, climate control and the like.

Figure 8:
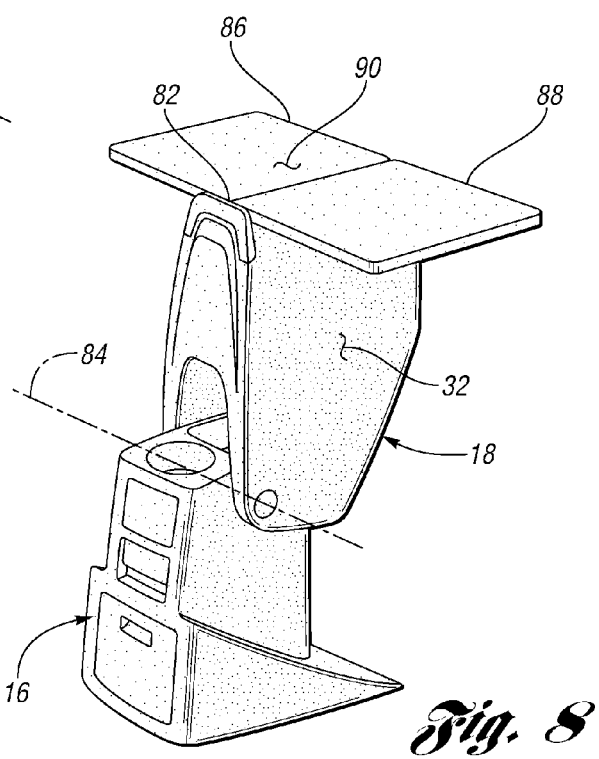
FIG. 8 is a perspective view of the console assembly in the deployed position.

Referring now to FIGS. 6-8, first and upper console modules 16, 18 of console assembly 10 are moved from a stored position illustrated in FIG. 6, to an upright position in FIG. 7 and a deployed position in FIG. 8. It is contemplated that the bracket arrangement described and illustrated in FIGS. 3a and 3b may be applied to the console assembly illustrated in FIGS. 6-10. However, it is understood that the upper console module housing may be pivotally connected and adjusted relative to the lower console module housing using a variety of mounting arrangements, such as direct pivotal connections of the upper console module housing to the side surfaces of the lower console module housing that cooperate with locking mechanisms to ensure that the upper console module is releasably secured in the upright position relative to the lower console module housing.

FIG. 7 illustrates upper console module 18 in an upright position pivoted about the pivot axis 84 relative to the lower console module 16 for use in the passenger compartment of the vehicle. FIG. 8 illustrates a pair of panels 86, 88 extending generally planar and parallel to the rear surface 82 of the upper console module housing 32 to provide a presentation surface 90 for use by occupants of the passenger compartment of the vehicle. Panels 86, 88 may include a latching mechanism (not shown) for securing the panels 86, 88 in a generally perpendicular deployed position relative to the upper console module housing 32. Lower console module 16 may further include a release mechanism 91 disposed on a front surface of the lower console module 16 that cooperates to releasably secure the upper console module 18 to the lower console module 16.

Referring to FIGS. 9a and 9b, various storage and deployment arrangements of the panels 86, 88 for use in connection with console assembly 10 are described and illustrated. FIG. 9a illustrates a upper console module 18 having a pair of panels 86, 88 illustrated in a generally planar arrangement with the rear surface 82 of the upper console module housing 32. Panels 86, 88 may be pivotally connected to the upper console module housing 32 by hinges 92. Panels 86' and 88' illustrate rotation of the panels about hinges 92 prior to 180 degree rotation of the panels to a deployed position illustrated by reference numerals 86" and 88". In this arrangement, a supplemental panel (not shown) may be inserted into the opening in the rear surface 82 of the upper console module housing 32 to cooperate with the panels in the deployed position 86", 88" to provide the presentation surface. Alternatively, the supplemental panel may be integrally molded with the upper console module 18.

FIG. 9b illustrates another deployment arrangement of the panels of the console assembly 10 of the present invention. New reference numerals are applied to panels for illustrative purposes only. Panels 94, 96 are stored within a cavity 98 in the upper console module housing 32 and are accessible through an opening in the rear surface 82 of the upper console module housing 32. It is contemplated that a cover may be applied to the opening in the rear surface 82 for aesthetic purposes.

Panels 94, 96 may be pivotally or translationally mounted by a variety of connectors to the upper console module housing to allow the panels 94, 96 to be positioned thereon. Panels 94, 96 are moved from a stowed position to a secondary position illustrated by reference numbers 94', 96' before being positioned in a deployed position illustrated by panels 94", 96". Once placed in the deployed position, panels 94", 96" at least partially cover the opening in the rear surface 82 of the upper console module housing 32. As illustrated in FIG. 9b, it is contemplated that panels 94", 96" may be disposed adjacent each other to provide a presentation surface 100.

Referring now to FIGS. 10a and 10b, another implementation of the console assembly 10 is illustrated and described. A video display 102 may be configured for use with the console assembly 10. As illustrated in FIGS. 10a and 10b, video display may be formed of any known properties, include cathode ray tube (CRT), liquid crystal display (LCD) or a light emitting diode (LED) display. Display 102 may be powered by the vehicle electrical system or an alternative power source. Display 102 may include a media player or be connectable to a media player incorporated in the vehicle or a player removable from the vehicle.

FIG. 10a illustrates a display 102 that may be integrally formed with or securable to a mount 104 cooperating with panels 86, 88 in the upper console module 18. Mount 104 may be configured to translate vertically with and between the one or more panels 86, 88 and to rotate for display in the passenger seating area when disposed above the panels 86, 88 placed in the deployed position. Alternatively, as illustrated in FIG. 10b, display 102 may be configured for mounting to a panel 106. Panel 106 includes a cavity 108 sized such that the display, when moved from a display position illustrated in FIG. 10b to a stored position, is stored within the cavity 108 as illustrated by panel 110.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A console assembly configured for use in a passenger seating area of a vehicle, the console assembly comprising:
    a lower console module extending generally horizontally and disposed adjacent a floor of the passenger seating area;
    an upper console module disposed adjacent and operatively connected to the lower console, wherein the upper console module is movable relative the lower console module between a first position and at least one second position; and
    a pair of panels pivotally connected to the upper console module the pair of panels adjustable between at least a stored position wherein the panels are disposed adjacent the upper console module and a deployed position
    wherein the pair of panels form a presentation surface for use in the passenger seating area of the vehicle when the panels are disposed in the deployed position.

2. The console assembly of claim 1 wherein the lower console module further comprises a base securable to the vehicle floor, a front surface, a rear surface, opposing side surfaces extending between the front and rear surfaces and a top surface.

3. The console assembly of claim 2 wherein the lower console module further includes at least one storage compartments accessible through the opening in the front surface.

4. The console assembly of claim 2 further comprising a beverage container holder formed into a top surface of the lower console module.

5. The console assembly of claim 1 wherein the upper console module includes a second bracket operatively connected to a first bracket in the lower console module to adjust the upper console module relative to the lower console module.

6. The console assembly of claim 5 wherein a locking mechanism cooperates with at least one channel formed on a guide on the first bracket to position the upper console module in a deployed position relative to the lower console module.

7. The console assembly of claim 5 further comprising at least one storage compartment formed in a top surface of the upper console module and a cover movable between an open position and a closed position at least partially covering the at least one storage compartment.

8. The console assembly of claim 5 wherein the pair of panels are pivotally connected to the second bracket of the upper console module.

9. The console assembly of claim 1 wherein the pair of panels are pivotally connected to and received within a cavity in the upper console module.

10. A console assembly configured for use in a passenger seating area of a vehicle, the console assembly comprising:
 a lower console module extending generally horizontally between the pair of passengers seats the lower console module including a housing having a base securable to the vehicle floor, a front surface, a rear surface, opposing side surfaces extending between the front and rear surface, a top surface and a first bracket cooperating therewith;
 an upper console module having a housing disposed adjacent to the lower console module having a second bracket operatively connected to the first bracket in the lower console module to position the upper console module relative the lower console module between a first position and at least one second position; and
 a pair of panels pivotally connected to the second bracket of the upper console module adjustable between at least a stored position wherein the pair of panels are disposed adjacent the upper console module housing and a deployed position;
 wherein the pair of panels extend generally planar to a rear surface of the upper console module to form a presentation surface for use in the passenger seating area of the vehicle.

11. The console assembly of claim 10 wherein a locking mechanism cooperates with one of a plurality of channels formed on a guide on the first bracket to position the upper console module in a deployed position relative to the lower console module.

12. The console assembly of claim 10 further comprising at least one storage compartment formed in a top surface of the upper console module housing having a cover movable between an open position and a closed position at least partially covering the at least one storage compartment.

13. The console assembly of claim 1 wherein the pair of panels each include an aperture configured to receive beverages in the deployed position.

14. The console assembly of claim 10 wherein the pair of panels each include an aperture configured to receive beverages in the deployed position.

15. The console assembly of claim 1 wherein the pair of panels are generally planar with a rear surface of the upper console module when the pair of panels are in a deployed position.

16. The console assembly of claim 1 wherein the upper console module is generally vertical in the at least one second position.

17. The console assembly of claim 10 wherein the pair of panels form a generally continuous planar surface in the deployed position.

18. The console assembly of claim 10 wherein the pair of panels are pivotally connected to and received within a cavity in the upper console module.

* * * * *